UNITED STATES PATENT OFFICE.

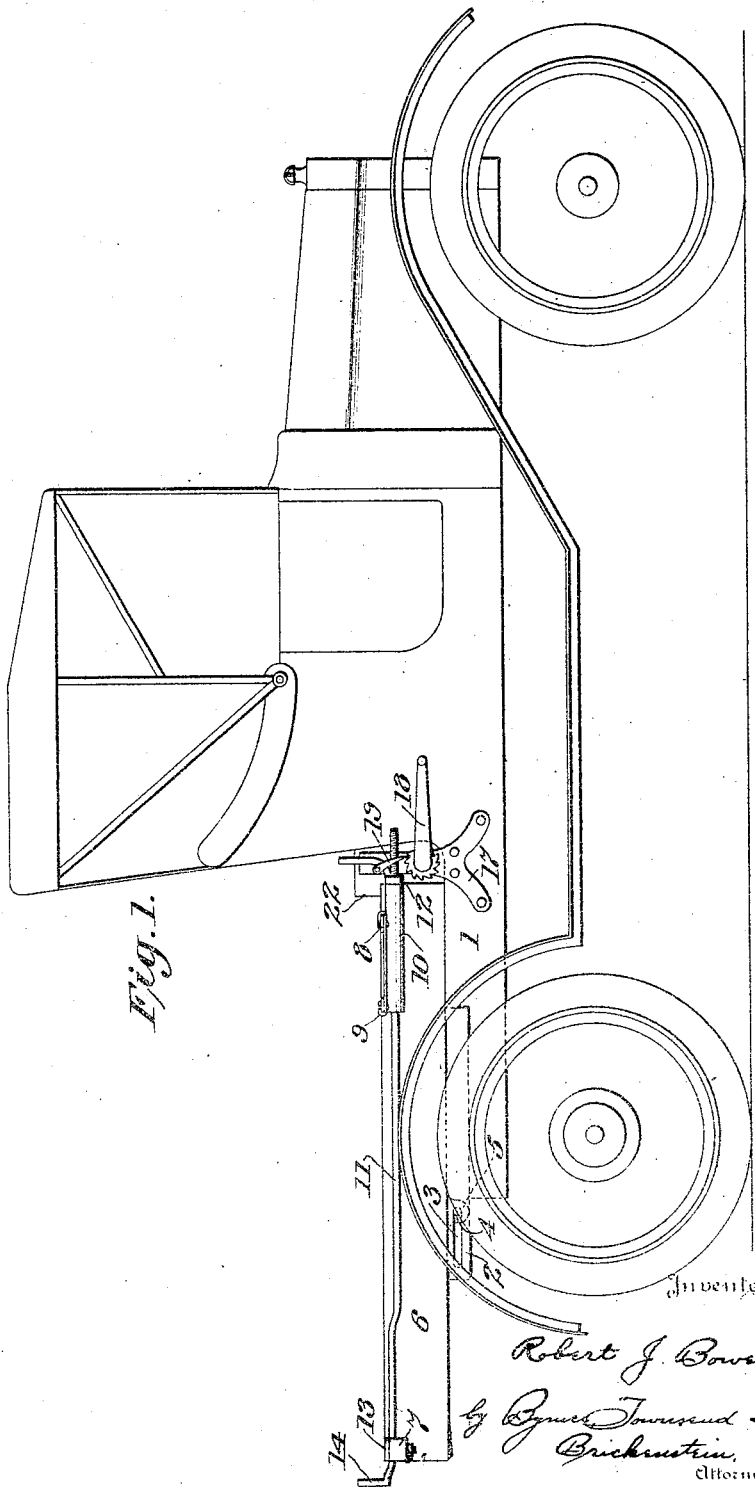

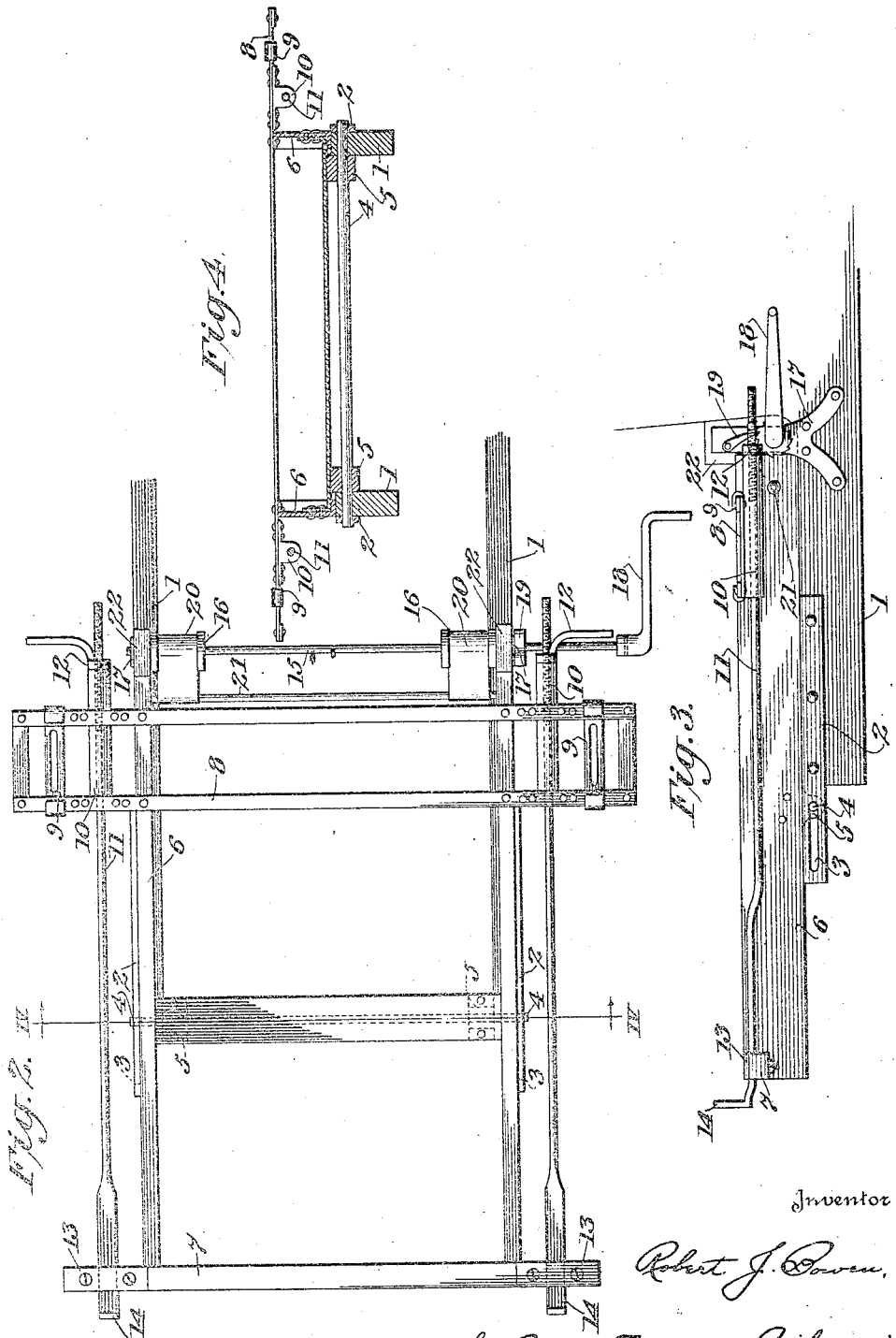

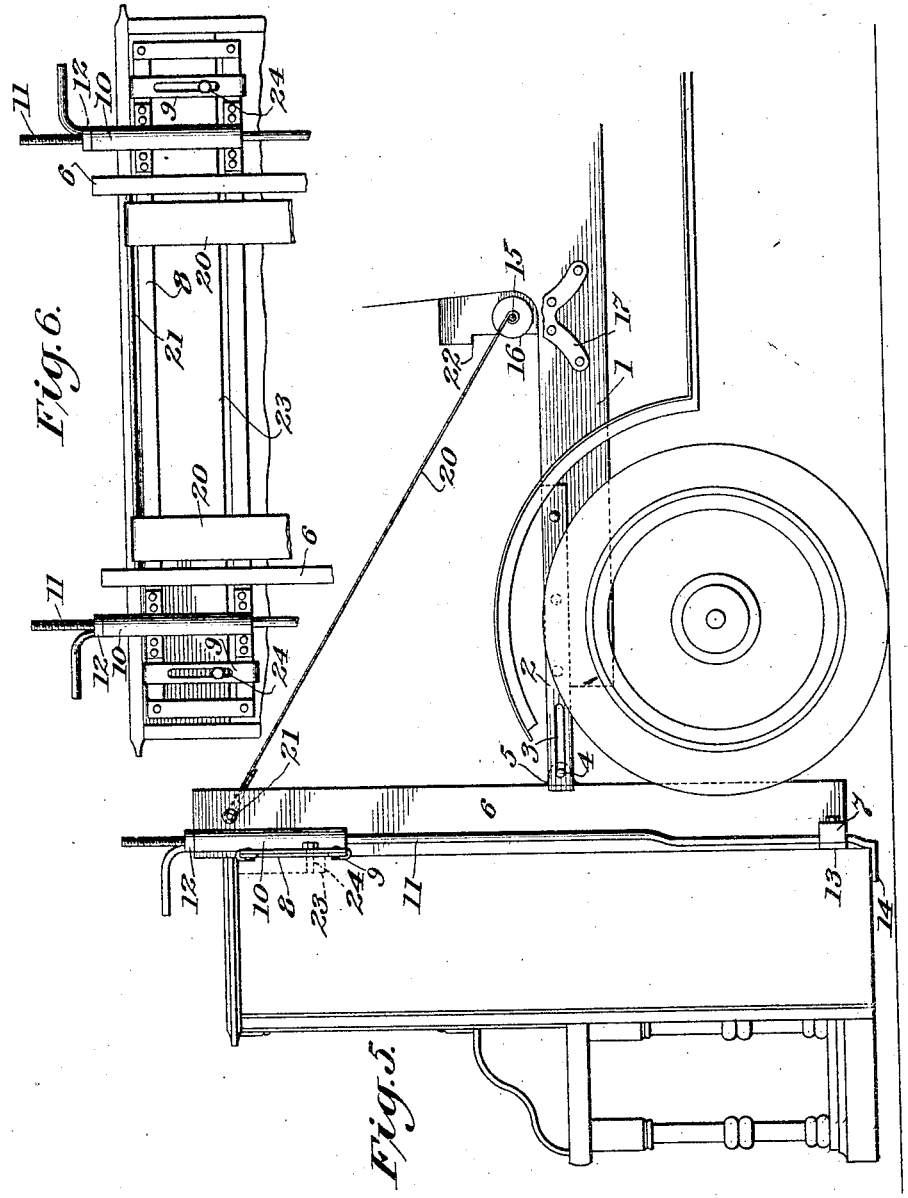

ROBERT J. BOWEN, OF WINSTON-SALEM, NORTH CAROLINA.

DEVICE FOR TRANSPORTING PIANOS AND THE LIKE.

1,245,560.    Specification of Letters Patent.    Patented Nov. 6, 1917.

Application filed April 2, 1917. Serial No. 159,257.

*To all whom it may concern:*

Be it known that I, ROBERT J. BOWEN, a citizen of the United States, residing at Winston-Salem, in the county of Forsyth and State of North Carolina, have invented certain new and useful Improvements in Devices for Transporting Pianos and the like, of which the following is a specification.

At present, dealers in bulky musical instruments, such as pianos, especially those dealers whose territories include country and outlying districts, have difficulty in bringing their instruments before prospective purchasers because of the bulky nature of such instruments and the difficulty of handling them, and displaying and demonstrating them.

The object of this invention is to overcome these difficulties and inconveniences by providing for easily loading and unloading and transporting the goods, and, if desirable, displaying and demonstrating them upon the premises of the prospective purchaser.

To this end, the invention consists in a frame adapted to be mounted upon a vehicle, such as a motor car or truck, and so constructed as to be capable of being tilted from an upright or vertical to a horizontal position, or vice versa, and provided with means for controlling this tilting movement, and also with means for adjusting the article fastened to the frame irrespective of said tilting movement; the frame being provided also with means for adjustably and removably securing the article thereto, all as I will proceed now to explain and claim.

In the accompanying drawings illustrating the invention, in the several figures of which like parts are similarly designated.

Figure 1 is an elevation showing the device applied to a motor vehicle;

Fig. 2 is a top plan view;

Fig. 3 is a side elevation of the device on a larger scale than that of Fig. 1;

Fig. 4 is a transverse vertical section taken in the plane of line IV—IV of Fig. 2;

Fig. 5 is a side elevation showing the frame tilted to its vertical position and having a piano mounted thereupon and carried thereby; and Fig. 6 is a fragmentary rear view of the upper part of the frame, showing the means for detachably securing a piano or other article thereto.

The vehicle body 1 is provided on each side with a bearing member 2 having an elongated opening 3 to receive the ends of a pivot-bar 4 mounted preferably in ears 5 attached to the frame of the device. This frame is composed primarily of side members 6, an end member 7 and a cross-frame member 8, and these are all made of suitable material such as steel, and are riveted or otherwise suitably secured together. Struts and other strengthening elements may be added if desired. The cross-frame member 8 is provided with longitudinally slotted pieces 9 slidably mounted thereon, for a purpose presently appearing, and bearing-pieces or sleeves 10, one on each side, in which are slidably supported rods 11 having their forward ends screw-threaded and provided with adjusting nuts 12 which bear against the ends of the bearing-pieces 10. The rear ends of these rods are flattened and slidably supported in bearings 13 in the member 7 and their extremities are bent at right angles as at 14 to form supports for the article to be mounted on the frame.

A suitable windlass comprising a shaft 15 and drums 16 is mounted in brackets or bearing-pieces 17 attached to the body 1, and the shaft 15 is provided with suitable operating means such as a hand-crank 18 and pawl and ratchet mechanism 19, though it is obvious that power-operated mechanism may be substituted therefor, if desired.

Bands 20 attached at one end to the drums 16 and at the other ends to the frame, as at 21, are provided for communicating the power of the windlass to the frame, but it is obvious that cables or ropes might be substituted for the bands 20 and be equally effective for the purpose.

Hold-down stops 22 are mounted on the body 1 and are adapted to coöperate with the forward ends of the side members 6 of the frame to hold it rigidly upon the vehicle body 1 during transportation.

Pianos are provided, at the back near the top, with a heavy cross-member, indicated in dotted lines in Fig. 5 and in full lines in Fig. 6 at 23, and this cross-member 23 is used to attach the piano to its shipping crate, when shipped from the factory or elsewhere as is now common practice, by passing screws through the back of the crate and embedding them in the cross-member 23. I utilize the holes left in the cross-member when these screws are withdrawn, for attaching the piano to the frame, by passing a lag or other screw 24 through the slot in each of the pieces 9 and driving these screws into the holes. The pieces 9 being slidably mounted on the cross-frame member, they may be moved to a position where their slots will register with the holes.

The operation of the device is as follows—For loading, the frame is tilted to its vertical position, as shown in Fig. 5, and by means of the nuts 12 the rods 11 are lowered so that their extremities 14 may be moved beneath the piano, or the piano be moved to a position over them. Then the back of the piano is forced against the frame and the screws 24 are passed through the slotted pieces 9 and driven into the cross-member 23. The nuts 12 are then operated to clamp the ends 14 of rods 11 against the bottom of the piano or, if desired, to raise the piano off of the ground, this being made possible by the slots in the pieces 9 which allow longitudinal travel of the screws 24. When the piano is satisfactorily adjusted the screws 24 may be further tightened. The windlass is then operated to tilt the frame, and with it the piano, upon the pivot 4 until the frame and piano rest in a horizontal position upon the vehicle body 1, the windlass being further operated to draw the frame forward until it is stopped and held down by the hold-down stops 22. The piano is then ready to be transported. Unloading is accomplished by reversing the foregoing operations. If it is desired to demonstrate the piano *en route*, it may be adjusted to the vertical position and played while supported by the frame, or it may be lowered by means of the nuts 12 and rods 11 so as to rest upon the ground but still be attached to the frame.

Of course the frame may be held in any over-balanced position by means of the pawl and ratchet mechanism 19.

Although the invention has been explained as for use with pianos, it is obvious that it is equally applicable for transporting other heavy articles, and it is to be so understood.

Various changes in details of construction and arrangement of parts are of course within the spirit of the invention and the scope of the appended claims.

What I claim is:—

1. A device for transporting pianos and the like, comprising a frame, means for securing the piano upon said frame, a pivot on said frame, a vehicle body having slotted bearings with which said pivot coöperates and means mounted on said vehicle body and coöperating with said frame for tilting said frame upon its pivot.

2. A device for transporting pianos and the like, comprising a frame, means for securing the piano upon said frame and adjusting it with relation thereto, a pivot on said frame, a vehicle body having slotted bearings with which said pivot coöperates, and means mounted on said vehicle body and coöperating with said frame for tilting said frame upon its pivot.

3. A device for transporting, displaying and demonstrating pianos and the like, comprising a frame having a pivot member mounted in bearings on a vehicle, means for adjustably supporting and securing a piano on said frame including longitudinally adjustable rods, a power appliance mounted on the vehicle and coöperating with the frame to tilt it on its pivot, and means for holding said frame in fixed relation to the body of said vehicle for purposes of transportation.

4. A device for transporting pianos and the like, comprising a frame pivotally mounted upon a vehicle, said frame comprising side members and end and cross-frame members, bearings on said end and cross-frame members, screw-threaded rods mounted to slide in said bearings and capable of positive longitudinal adjustment, slotted members on said cross-frame members which in conjunction with said rods provide for securing a piano or the like upon said frame, a windlass mounted upon said vehicle and coöperating with said frame to tilt it upon its pivot, and a hold-down stop on said vehicle adapted to coöperate with said frame.

5. A device for transporting pianos and the like, comprising a frame, bearings on said frame, screw-threaded rods slidably mounted in said bearings and having their rear ends bent to engage a piano or the like, nuts coöperating with said screw-threaded rods and said bearings to adjust said rods longitudinally, slotted members slidably mounted on said frame and adapted to receive screws for holding and adjusting a piano or the like on said frame in coöperation with said rods, a windlass on said vehicle having bands attached to said frame for tilting it upon its pivot, and a hold-down stop on said vehicle coöperating with said frame to hold it in transporting position.

6. A device for transporting pianos and the like, comprising a frame pivotally mounted upon a vehicle, said frame comprising side members and end and cross-frame members, bearings on said end and cross-frame members, screw-threaded rods mounted to slide in said bearings and capable of positive longitudinal adjustment, means for securing a piano or the like upon said frame, a windlass mounted upon said vehicle and coöperating with said frame to tilt it upon its pivot and a hold-down stop on said vehicle adapted to coöperate with said frame.

7. A device for transporting pianos and the like, comprising a frame pivotally mounted upon a vehicle, said frame comprising side members and end and cross-frame members, bearings on said end and cross-frame members, screw-threaded rods mounted to slide in said bearings and capable of positive longitudinal adjustment, means for securing a piano or the like upon said frame, means for tilting said frame and means for holding said frame onto the vehicle.

In testimony whereof I affix my signature in presence of two witnesses.

ROBERT J. BOWEN.

Witnesses:
F. P. HOLLEMAN,
H. W. FOLTZ.